US012499529B2

(12) United States Patent
Mishina et al.

(10) Patent No.: US 12,499,529 B2
(45) Date of Patent: Dec. 16, 2025

(54) DEFECT DETECTION DEVICE

(71) Applicant: SHIMADZU CORPORATION, Kyoto (JP)

(72) Inventors: Naoto Mishina, Kyoto (JP); Hiroshi Horikawa, Kyoto (JP); Satoru Sugimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 328 days.

(21) Appl. No.: 18/124,225

(22) Filed: Mar. 21, 2023

(65) Prior Publication Data
US 2023/0306575 A1 Sep. 28, 2023

(30) Foreign Application Priority Data

Mar. 28, 2022 (JP) .................. 2022-052596

(51) Int. Cl.
G06T 7/00 (2017.01)
(52) U.S. Cl.
CPC ........ *G06T 7/0004* (2013.01); *G06T 2200/24* (2013.01)
(58) Field of Classification Search
CPC .............. G06T 7/0004; G06T 2200/24; G01N 29/2418; G01N 29/4436; G01N 29/0654
See application file for complete search history.

(56) References Cited

U.S. PATENT DOCUMENTS 11,079,303 B1* 8/2021 Mishra ................ G01M 5/0075
2009/0147074 A1* 6/2009 Getty .................... A61B 6/502
348/51

2017/0350690 A1 12/2017 Hatahori et al.
2018/0283847 A1 10/2018 Hatahori et al.
2019/0204275 A1* 7/2019 Hatahori ............ G01N 29/0654
(Continued)

FOREIGN PATENT DOCUMENTS

JP 2017-219318 A 12/2017
JP 2018-169204 A 11/2018
(Continued)

OTHER PUBLICATIONS

Office Action for corresponding Japanese Patent Application No. 2022-052596, dated Jul. 8, 2025, with machine translation.

*Primary Examiner* — John R Wallace
(74) *Attorney, Agent, or Firm* — Renner, Otto, Boisselle & Sklar, LLP

(57) ABSTRACT

A defect detection device includes: an excitation unit configured to apply vibration to an inspection object; a vibration state image creation unit configured to measure by an optical means a vibration state in a measurement area on a surface of the inspection object to which the vibration is applied, and to create one or more types of vibration state images representing the vibration state in the measurement area depending on a result of the measurement; an optical image acquisition unit configured to acquire an optical image in the measurement area; an image display unit configured to display an image; and a display control unit configured to perform control to simultaneously display two images among the one or more types of vibration state images and the optical image for the same area in the measurement area on the image display unit.

5 Claims, 7 Drawing Sheets

(56) References Cited

U.S. PATENT DOCUMENTS

| | | | |
|---|---|---|---|
| 2020/0116586 A1* | 4/2020 | Hayzen | G01H 1/003 |
| 2022/0051390 A1 | 2/2022 | Yoshida et al. | |
| 2022/0122638 A1* | 4/2022 | Hay | G11B 27/022 |

FOREIGN PATENT DOCUMENTS

| | | |
|---|---|---|
| WO | 2017/221324 A1 | 12/2017 |
| WO | 2020/110197 A1 | 6/2020 |
| WO | 2022/059710 A1 | 3/2022 |

\* cited by examiner

OPTICAL IMAGE

MOVING IMAGE

AMPLITUDE DISTRIBUTION IMAGE

WAVELENGTH DISTRIBUTION IMAGE

DEFECT DETECTION DEVICE

TECHNICAL FIELD

The present invention relates to a defect detection device that detects a defect present in an inspection object.

BACKGROUND ART

Conventionally, there has been proposed a defect detection device which generates an elastic wave in an inspection object to detect a defect present in the inspection object. In the defect detection device described in Patent Literature 1, speckle interferometry or speckle-sharing interferometry is used for defect detection. In the speckle interferometry, laser light from a laser light source is branched into illumination light and reference light, and an inspection area is irradiated with the illumination light. Then, an interference pattern is obtained with light reflected at each point on the surface of the inspection object in the inspection area and the reference light. In the speckle-sharing interferometry, an inspection area is irradiated with laser light from a laser light source (without branching reference light), and an interference pattern is obtained with light reflected from two adjacent points on a surface of an inspection object in the inspection area.

The conventional defect detection device described in Patent Literature 1 measures a displacement in an out-of-plane direction (direction perpendicular to a plane) of each point at a phase of an elastic wave (in the case of speckle interferometry) or a relative displacement in an out-of-plane direction between two adjacent points (in the case of speckle-sharing interferometry) by using strobe illumination that flashes in synchronization with the elastic wave while contacting a vibrator on the inspection object to generate the elastic wave in the inspection object. Based on the data obtained by performing this operation in at least three different phases of sinusoidal elastic waves, the vibration state can be reproduced as a moving image over the entire inspection area, or the spatial distribution of the amplitude can be indicated by a still image represented by different colors. At a position where a defect exists, the moving image shows that the vibration state is spatially discontinuous, and the still image of the spatial distribution of the amplitude shows that the amplitude is different from that at other positions, so that the defect in the inspection area can be detected.

CITATION LIST

Patent Literature

Patent Literature 1: JP 2017-219318 A

SUMMARY OF INVENTION

Technical Problem

In the above-described conventional defect detection device, not only a defect but also a portion of the inspection object other than a defect such as a step originally existing in the inspection object may appear in a moving image or in a still image indicating amplitude, in a vibration state similar to the defect. Therefore, in the conventional defect detection device, an optical image of the inspection area is separately acquired, and the image displayed on a display device can be switched among the optical image, the moving image and the still image in response to a predetermined operation. Thus, an operator performs an operation of comparing a moving image or a still image with an optical image to confirm whether or not there is an object different from a defect at a position that looks like a defect in the moving image or the still image. However, in the conventional defect detection device, it is necessary for the operator to determine which position on the optical image corresponds to the position on the moving image or the still image indicating the vibration state depending on the position of the defect, the step, or the like appearing in those images, which may cause misrecognition of the position.

In addition, in order to more reliably detect a defect, the operator determines the presence or absence of the defect depending on both the moving image and the still image, which also may cause misrecognition of the position for the same reason as in the case of comparison with the still image described above.

An object of the present invention is to provide a defect detection device capable of easily comparing positions between a plurality of images used for defect detection.

Solution to Problem

A defect detection device according to the present invention made to solve the above problems includes:
an excitation unit configured to apply vibration to an inspection object;
a vibration state image creation unit configured to measure by an optical means a vibration state in a measurement area on a surface of the inspection object to which the vibration is applied, and to create one or more types of vibration state images representing the vibration state in the measurement area according to the result of the measurement;
an optical image acquisition unit configured to acquire an optical image in the measurement area;
an image display unit configured to display an image; and
a display control unit configured to perform control to simultaneously display two images among the one or more types of vibration state images and the optical image for the same area in the measurement area on the image display unit.

Advantageous Effects of Invention

With the defect detection device of the present invention, two (or three or more) images among one or more types of vibration state images and optical images used for detection of a defect for the same display area in the measurement area are simultaneously displayed on the image display unit, so that positions can be easily compared between the images. Here, the vibration state images are images representing a vibration state of the inspection object, and their examples include a moving image, a still image indicating a distribution of amplitude, and a still image indicating a distribution of wavelength.

DESCRIPTION OF EMBODIMENTS

Figure 1:
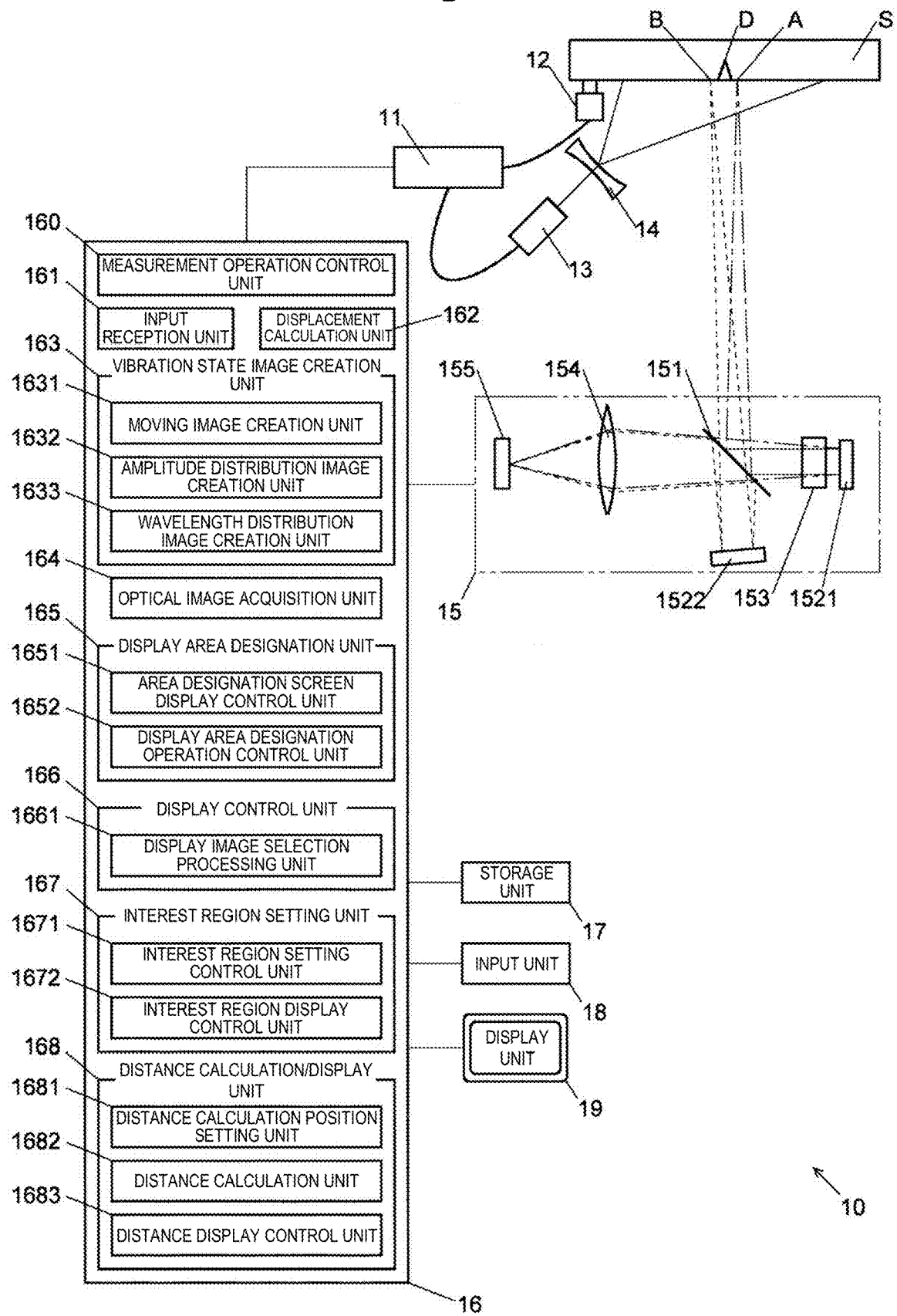
FIG. 1 is a schematic configuration diagram illustrating one embodiment of a defect detection device according to the present invention.

Embodiments of a defect detection device according to the present invention will be described with reference to FIGS. 1 to 13.

(1) Configuration of Defect Detection Device of Present Embodiment

A defect detection device 10 according to the present embodiment includes a signal generator 11, a vibrator 12, pulse laser light source 13, an illumination light lens 14, a speckle-sharing interferometer 15, a control unit 16, a storage unit 17, an input unit 18, and a display unit 19.

The signal generator 11 is connected to the vibrator 12 by a cable, generates an AC electric signal, and transmits the AC electric signal to the vibrator 12. The vibrator 12 is used in contact with an inspection object S, receives the AC electric signal from the signal generator 11, converts the AC electric signal into a mechanical vibration having the same frequency (vibration frequency) as the AC electric signal, and applies the mechanical vibration to the inspection object S. This generates an elastic wave in the inspection object S. The signal generator 11 and the vibrator 12 correspond to the excitation unit described above.

The signal generator 11 is also connected to the pulse laser light source 13 by a cable different from the cable connected to the vibrator 12, and transmits a pulsed electric signal (pulse signal) to the pulse laser light source 13 at timing when the AC electric signal becomes a predetermined phase. The pulse laser light source 13 is a light source that outputs pulse laser light when receiving a pulse signal from the signal generator 11. The illumination light lens 14 is disposed between the pulse laser light source 13 and the inspection object S, and includes a concave lens. The illumination light lens 14 has a role of spreading the pulse laser light from the pulse laser light source 13 over the entire measurement area of the surface of the inspection object S. In this way, the measurement area on the surface of the inspection object S is illuminated by strobe illumination.

The speckle-sharing interferometer 15 includes a beam splitter 151, a first reflecting mirror 1521, a second reflecting mirror 1522, a phase shifter 153, a condenser lens 154, and an image sensor 155. The beam splitter 151 is a half mirror arranged at a position where the illumination light reflected by the measurement area on the surface of the inspection object S is incident. The first reflecting mirror 1521 is arranged on an optical path of the illumination light reflected by the beam splitter 151, and the second reflecting mirror 1522 is arranged on an optical path of the illumination light transmitted through the beam splitter 151. The phase shifter 153 is arranged between the beam splitter 151 and the first reflecting mirror 1521, and changes (shifts) a phase of light passing through the phase shifter 153, and a change amount of the phase can be changed. The image sensor 155 is arranged on an optical path of illumination light that is reflected by the beam splitter 151, reflected by the first reflecting mirror 1521 and then transmitted through the beam splitter 151, and an optical path of illumination light that is transmitted through the beam splitter 151, reflected by the second reflecting mirror 1522, and then reflected by the beam splitter 151. The condenser lens 154 is arranged between the beam splitter 151 and the image sensor 155.

The first reflecting mirror 1521 is arranged such that its reflection surface forms an angle of 45° with respect to the reflection surface of the beam splitter 151. On the other hand, the second reflecting mirror 1522 is arranged such that its reflection surface is slightly inclined from 45° with respect to the reflection surface of the beam splitter 151. With the arrangement of the first reflecting mirror 1521 and the second reflecting mirror 1522, in the image sensor 155, irradiation light reflected at a point A on the surface of the inspection object S and by the first reflecting mirror 1521 (one-dot chain line in FIG. 1) and irradiation light reflected at a point B at a position slightly shifted from the point A on the surface and by the second reflecting mirror 1522 (dashed line in FIG. 1) are incident on the same position of the image sensor 155 and interfere with each other. At that time, since the phase of the irradiation light reflected by the first reflecting mirror 1521 changes by the change amount set by the phase shifter 153, the phase difference with the irradiation light reflected by the second reflecting mirror 1522 also changes accordingly.

The image sensor 155 includes a large number of detection elements, and detects light incident on the image sensor 155 from a large number of points (the point A) on the surface of the inspection object S through the first reflecting mirror 1521 and the phase shifter 153 by different detection elements. Similarly for the point B, light incident on the image sensor 155 from a large number of points through the second reflecting mirror 1522 is detected by different detection elements.

In the present embodiment, the image sensor 155 included in the speckle-sharing interferometer 15 is used for creating a vibration state image and also for creating an optical image. The optical image is created depending on the intensity of the interference light between the irradiation light reflected by the first reflecting mirror 1521 and the irradiation light reflected by the second reflecting mirror 1522, detected by the image sensor 155 (details will be described later). In this case, light is incident on each detection element of the image sensor 155 from two points on the surface of the inspection object S, but since those two points are located close to each other, it can be regarded that light is incident on each detection element from one point on the surface of the inspection object S as in a normal optical image. Note that, instead of using the image sensor 155, an optical image may be acquired by separately providing a camera for capturing an optical image.

The storage unit 17 is a device that stores measurement data such as an intensity value of a detection signal obtained from each detection element of the image sensor 155 and data such as a displacement value in an out-of-plane direction for each position calculated by the displacement calculation unit 162, and also stores software that executes control by the control unit 16. The input unit 18 is an input device to which an operator inputs predetermined information, such as a keyboard, a mouse, a touch panel, or a combination of these. The display unit 19 corresponds to the image display unit described above, and is a display that simultaneously displays a plurality of images among one or a more types of vibration state images and optical images (actual images). In addition, besides the function of displaying a plurality of vibration state images and optical images, the display unit 19 has a function of displaying only one of these images and a function of displaying information other than images.

The control unit 16 includes, as functional blocks, a measurement operation control unit 160, an input reception unit 161, a displacement calculation unit 162, a vibration state image creation unit 163, an optical image acquisition unit 164, a display area designation unit 165, a display control unit 166, an interest region setting unit 167, and a distance calculation/display unit 168. The control unit 16 is embodied by hardware such as a CPU, and software for executing each operation. Hereinafter, each unit (functional block) included in the control unit 16 will be described.

The measurement operation control unit 160 controls the operation of each unit when performing measurement, particularly the operation of the signal generator 11 and the speckle-sharing interferometer 15.

The input reception unit 161 receives information for selecting an image to be displayed on the display unit 19, information for setting an image display area and an interest region, information for setting a section for calculating a distance, and the like, which are input by the operator using the input unit 18, and transmits the information to each unit that executes the display and the setting.

The displacement calculation unit 162 performs processing of obtaining a displacement in the out-of-plane direction for each position on the surface of the inspection object S depending on a detection signal obtained from each detection element of the image sensor 155.

The vibration state image creation unit 163 performs processing of creating a vibration state image indicating a vibration state of the inspection object S depending on a displacement in the out-of-plane direction obtained by the displacement calculation unit 162. In the present embodiment, three types of images including a moving image, a vibration distribution image indicating a distribution of amplitude of vibration, and a wavelength distribution image indicating a distribution of wavelength of vibration are created as vibration state images. The vibration state image creation unit 163 includes a moving image creation unit 1631, an amplitude distribution image creation unit 1632, and a wavelength distribution image creation unit 1633 corresponding to these three types of images.

The optical image acquisition unit 164 acquires a signal of intensity for each detection element detected by the image sensor 155 when the phase shifter 153 is set so that the phase difference between the irradiation light reflected by the first reflecting mirror 1521 and the irradiation light reflected by the second reflecting mirror 1522 becomes 0, and acquires an optical image depending on the signal.

The display area designation unit 165 includes an area designation screen display control unit 1651 and a display area designation operation control unit 1652. The area designation screen display control unit 1651 performs processing of displaying rectangular frames 41 (to be described later) having the same shape and size at the same position on each of two or more types of images including one or more types of vibration state images and/or optical images displayed on the display unit 19. The display area designation operation control unit 1652 executes control of an operation of designating an area in the frame 41 as a display area by an operator enlarging, reducing, and moving the frame 41 using a mouse or the like of the input unit 18 in one of two or more types of images displayed on the display unit 19 by the display control unit 166 described next.

The display control unit 166 performs control to simultaneously display two or more of the plurality of vibration state images created by the vibration state image creation unit 163 and the optical images acquired by the optical image acquisition unit 164 on the display unit 19. At that time, display areas of two or more images displayed simultaneously are set to be the same. When those images are first displayed, the display area is set to a predetermined area (the measurement area may be the entire measurement area or its part), and when the area is designated by the display area designation unit 165, processing is performed with the area set as the display area.

The display control unit 166 further includes a display image selection processing unit 1661. The display image selection processing unit 1661 displays a plurality of buttons corresponding to each of the plurality of vibration state images and optical images on the display unit 19, and then performs processing of selecting an image corresponding to a button clicked by the operator using the input unit 18 as an image to be displayed on the display unit 19.

The interest region setting unit 167 includes an interest region setting control unit 1671 and an interest region display control unit 1672. The interest region setting control unit 1671 performs control to set a position of one of two or more types of images displayed on the display unit 19 as an interest region in which the operator is interested in the presence or absence of a defect or the like by the operator performing a predetermined operation (for example, moving a mouse cursor so as to draw a closed curve) on a certain region in the image using the input unit 18. The interest region display control unit 1672 performs control to display a mark (for example, a closed curve indicating an outer edge of the interest region, an arrow, a triangular mark, or the like) indicating that the region set by the interest region setting control unit 1671 is an interest region in all of the two or more types of images displayed on the display unit 19. Note that the mark indicating an interest region may be displayed only on some of the two or more types of images displayed on the display unit 19.

The distance calculation/display unit 168 includes a distance calculation position setting unit 1681, a distance calculation unit 1682, and a distance display control unit 1683. The distance calculation position setting unit 1681 sets a distance between two points as a calculation target when the operator performs an operation to designate the two points using the input unit 18 on one of the two or more types of images displayed on the display unit 19. The distance calculation unit 1682 calculates the distance between the two points on the surface of the inspection object S (not the distance on the image) by calculating the distance on the image between the two points set by the distance calculation position setting unit 1681 and dividing the distance by the display magnification of the image. The distance display control unit 1683 performs processing of displaying on the display unit 19 the value of the distance calculated by the distance calculation unit 1682.

(2) Operation of Defect Detection Device of Present Embodiment

First, the operator places the inspection object S at a predetermined position of the defect detection device 10, and contacts the vibrator 12 on the inspection object S. Then, when the operator performs a predetermined operation using the input unit 18, the defect detection device starts operation.

The measurement operation control unit 160 controls the signal generator 11 so that the signal generator 11 transmits an AC electric signal having a predetermined frequency to the vibrator 12. As a result, vibration is applied from the vibrator 12 to the inspection object S to generate an elastic wave.

As described above, while the elastic wave is generated in the inspection object S, the measurement operation control unit 160 further causes the signal generator 11 to transmit the pulse signal to the pulse laser light source 13 at the timing when the AC electrical signal becomes a predetermined phase. As a result, the pulse laser light source 13 repeatedly outputs illumination light, which is pulse laser light, every time a pulse signal is received (that is, every time a vibration of the inspection object S determined by the AC electrical signal becomes the predetermined phase) (strobe illumination). The diameter of the illumination light is increased by the illumination light lens 14, and the entire measurement area of the surface of the inspection object S is irradiated with the illumination light.

The illumination light is reflected by the surface of the inspection object S and enters the beam splitter 151 of the speckle-sharing interferometer 15. A part of the illumination light is reflected by the beam splitter 151, passes through the phase shifter 153, is then reflected by the first reflecting mirror 1521, passes through the phase shifter 153 again, then partially passes through the beam splitter 151, and enters the image sensor 155. In addition, the rest of the illumination light incident on the beam splitter 151 is transmitted through the beam splitter 151 and reflected by the second reflecting mirror 1522, and a part of the illumination light is reflected by the beam splitter 151 and incident on the image sensor 155. In the image sensor 155, the irradiation light reflected at a large number of points on the surface of the inspection object S is detected by different detection elements.

Figure 2:
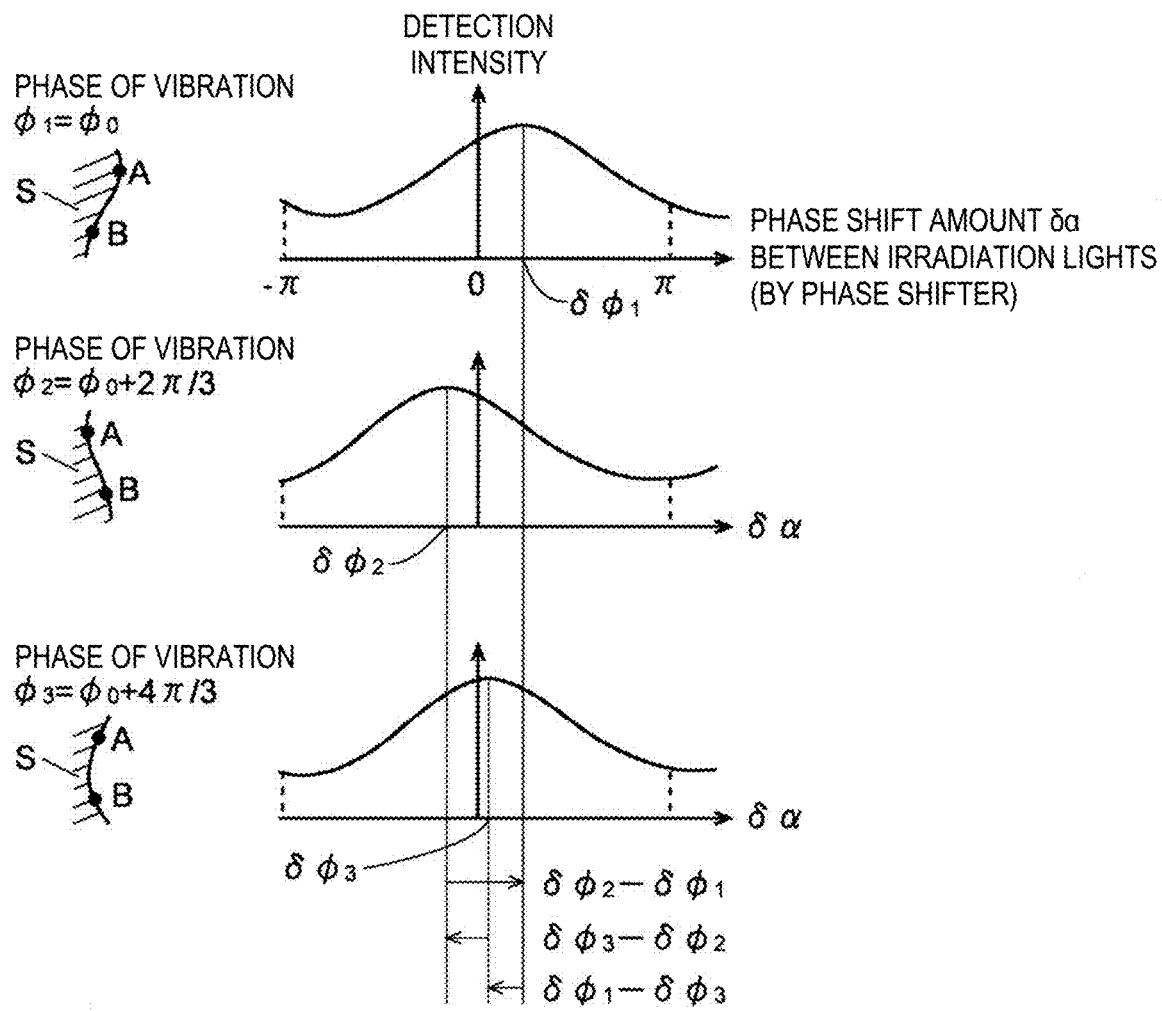
FIG. 2 is a diagram for explaining a method of obtaining displacement of a surface of an inspection object in the defect detection device of the present embodiment.

While the illumination light, which is pulse laser light, is repeatedly output, the phase shifter 153 changes (shifts) the phase of the irradiation light passing through the phase shifter 153 (that is, the irradiation light reflected at the point A). As a result, the phase difference (phase shift amount $\delta\alpha$) between the irradiation light reflected at the point A and the irradiation light reflected at the point B changes, and during this change, each detection element of the image sensor 155 detects interference light in which these two irradiation lights interfere with each other, and obtains its intensity. The upper part of FIG. 2 illustrates in a graph an example of the shift amount of the phase by the phase shifter 153 and the intensity of the interference light detected by the detection element of the image sensor 155, which are obtained when the vibration of the inspection object S is in a certain phase $\phi_1$. Although FIG. 2 illustrates the relationship in which the detection intensity changes sinusoidally with respect to the phase shift amount by a continuous curve, what is actually observed is discrete data, and a continuous sinusoidal waveform is reproduced from the observed data by a least squares method or the like. Therefore, the intensity is detected with at least three different phase shift amounts $\delta\alpha$.

The above operation is executed for each of a plurality of cases where the phase of vibration of the inspection object S is different (phases $\phi_2, \phi_3, \ldots$) by changing the timing of irradiation with the pulsed laser beam. FIG. 2 illustrates an example in which the interference light is detected in a total of three phases of phase $\phi_2 = \phi_1 + 2\pi/3$ and phase $\phi_3 = \phi_1 + 4\pi/3$ in addition to phase $\phi_1$. However, the detection of the interference light only needs to be performed in three or more phases, and the detection may be performed in three phases that are different from those in this example, or may be performed in four or more phases. The phases of the three or more (the number of which is n) vibrations are preferably set to be at equal intervals (which is, for example, in the case of n=3, $2\pi/3$ as in the above example) in order to smoothly replay the moving image described below, but may be set to be at unequal intervals.

Figure 3:
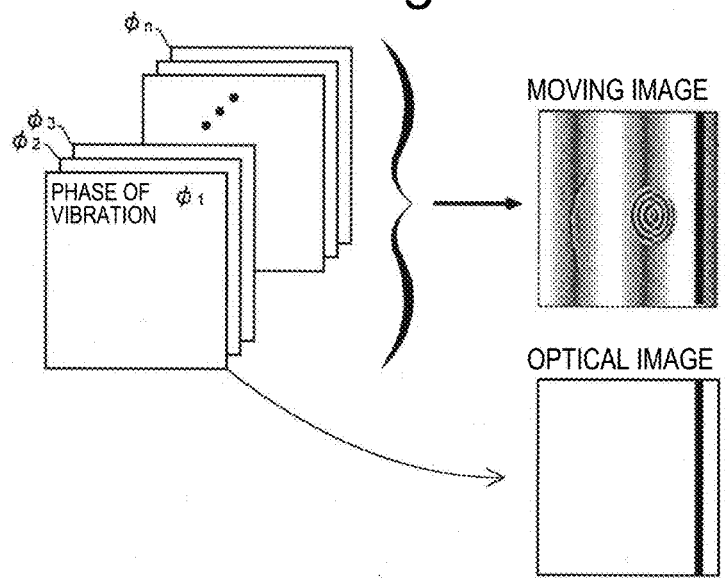
FIG. 3 is a diagram conceptually illustrating a method of acquiring a moving image and an optical image in the defect detection device according to the present embodiment.
Figure 4:
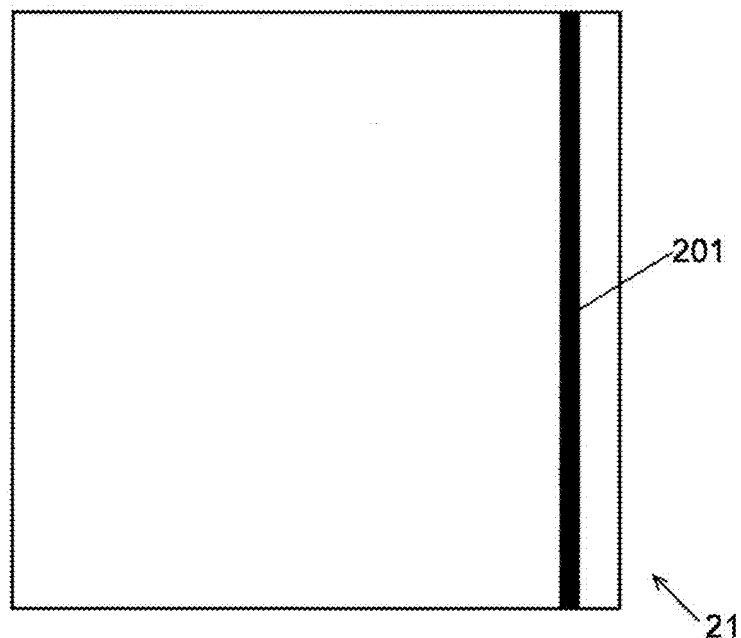
FIG. 4 is a diagram illustrating an example of an optical image.

When the phase difference $\delta\alpha$ between irradiation lights created by the phase shifter 153 is 0, the moving image creation unit 1631 generates a still image for each of phases $\phi_1, \phi_2, \ldots \phi_n$ (n is 3 or more) of each vibration depending on the detection intensity of the image sensor 155 (see FIG. 3). By sequentially replaying the n still images created in this way at a time interval (for example, if the phases of vibration are at equal intervals, the time intervals are also at equal intervals) corresponding to the phase interval of vibration, a moving image showing vibration in the measurement area of the surface of the inspection object S is obtained.

In addition, each of the n still images created by the moving image creation unit 1631 corresponds to an optical image obtained by photographing a measurement area of the surface of the inspection object S in a certain vibration phase. The optical image acquisition unit 164 acquires one of the n still images as an optical image.

For each detection element of the image sensor, the displacement calculation unit 162 obtains maximum output phase shift amounts $\theta\phi_1, \delta\phi_2, \delta\phi_3$, and so forth that maximize the output of the detection element while changing the phase shift amount by the phase shifter 153 in phases $\phi_1, \phi_2, \phi_3$, and so forth of each vibration, and accordingly further obtains a difference in the maximum output phase shift amount between different phases. For example, in the example illustrated in FIG. 2, the differences of the three maximum output phase shift amounts $(\delta\phi_2 - \delta\phi_1)$, $(\delta\phi_3 - \delta\phi_2)$, and $(\delta\phi_1 - \delta\phi_3)$ are obtained. The difference between the maximum output phase shift amounts indicates the relative displacement of the point A and the point B in the out-of-plane direction, with three or more sets of data in which the phase of vibration of the vibrator 12 is different (that is, time is different). Based on the three or more sets of relative displacements, values of three parameters indicating the vibration state of the inspection object S, that is, the amplitude of vibration, the phase of vibration, and the center value (DC component) of vibration at each point in the measurement area are obtained. The amplitude distribution image creation unit 1632 creates an amplitude distribution image depending on the value of the amplitude of vibration at each point in the measurement area obtained by the displacement calculation unit 162. Specifically, the color corresponding to the amplitude value is defined, and the coordinates of each point in the measurement area and the data indicating the color corresponding to the amplitude value of the point are stored in the storage unit 17 as the data of the amplitude distribution image.

In one of the n still images created by the moving image creation unit 1631, the wavelength distribution image creation unit 1633 executes the fast Fourier transform for each point in the measurement area using the data of the intensity values of a plurality of points within a predetermined range from each point, and stores the data in the storage unit 17 as the data of the distribution image indicating the difference in wavelength in the plane direction.

The above operation provides the optical image as well as the moving image, the amplitude distribution image, and the wavelength distribution image, which are images representing the vibration state, with respect to the entire measurement area on the surface of the inspection object S. FIGS. 4 to 7 illustrate examples of an optical image 21, a moving image 22, an amplitude distribution image 23, and a wavelength distribution image 24. In this example, a groove 201 (not a defect) originally provided on the surface of the inspection object S is reflected in the optical image 21, and nothing is seen other than the groove 201. The groove 201 also appears in the moving image 22, the amplitude distribution image 23, and the wavelength distribution image 24. Since all of the optical image 21, the moving image 22, the amplitude distribution image 23, and the wavelength distribution image 24 display the entire measurement area, the same area is displayed when the images are compared with each other.

Figure 5:
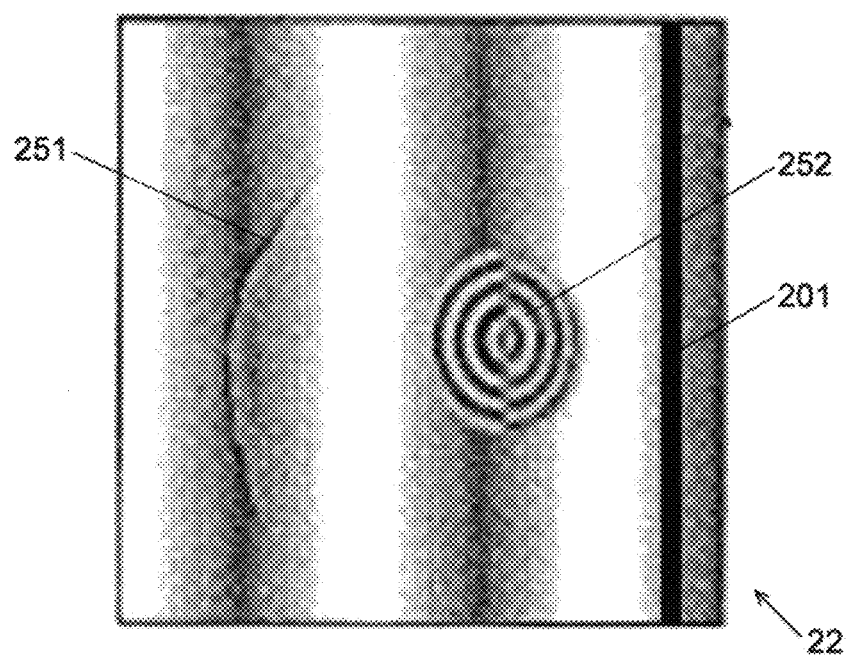
FIG. 5 is a diagram illustrating an example of a moving image.
Figure 6:
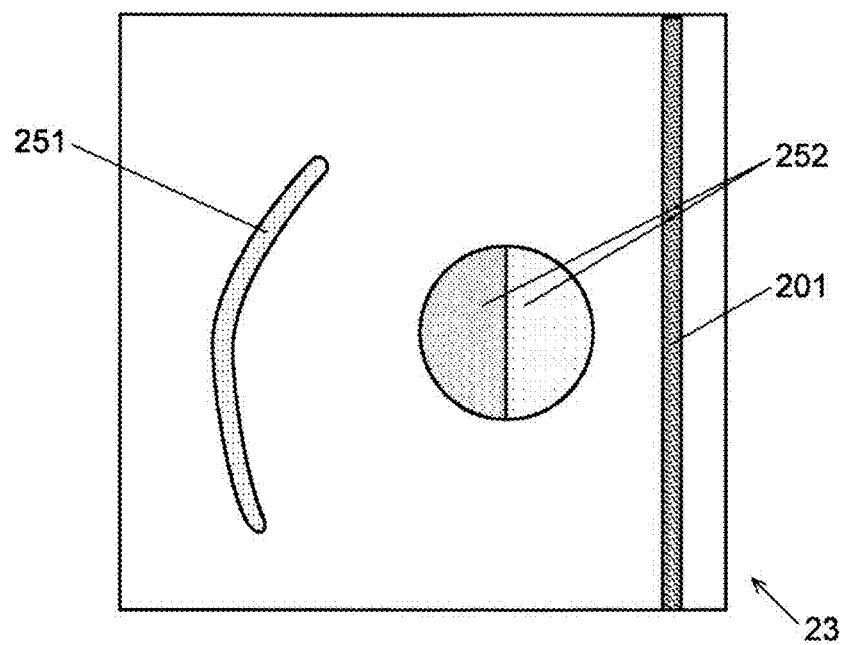
FIG. 6 is a diagram illustrating an example of an amplitude distribution image.
Figure 7:
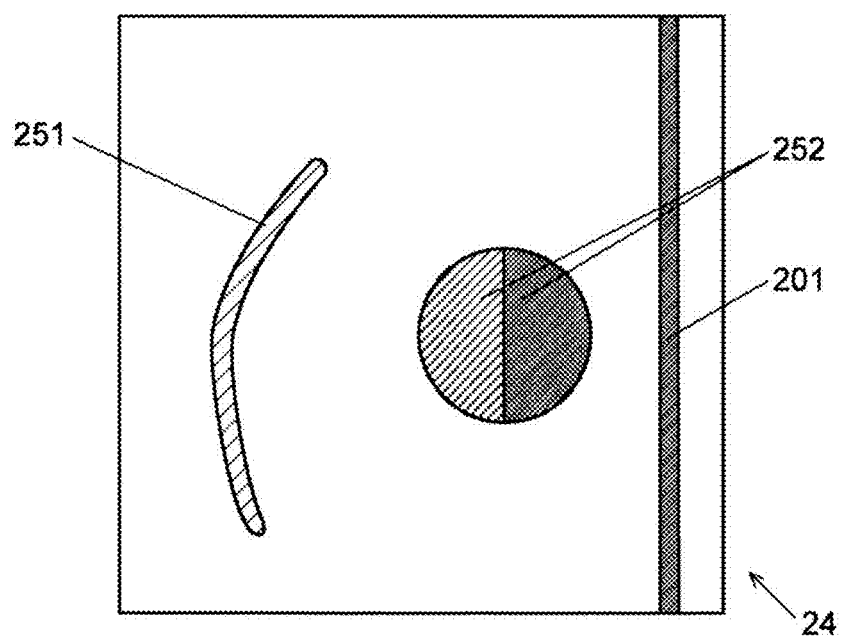
FIG. 7 is a diagram illustrating an example of a wavelength distribution image.

The moving image 22 is represented by a stationary stripe pattern in FIG. 5, but is actually represented by a moving image such that the position of the stripe changes with the lapse of time. In the moving image 22, there are areas that are discontinuous with other portions, such as a streaky area 251 that does not change even with the lapse of time and an area 252 in which a striped pattern is formed at an interval different from the surroundings. The streaky area 251 indicates that no vibration is generated due to a crack formed inside the inspection object S. An area 252 having stripes at different intervals indicates that a coating film formed on the surface of the inspection object S is peeled off, so that the inspection object S vibrates at a wavelength different from that of the inspection object S itself. These cracks and peeling of the coating film cannot be recognized visually or in the optical image 21.

The amplitude distribution image 23 and the wavelength distribution image 24 respectively indicate that the groove 201, the area 251 in which the crack is formed, and the peeled coating film area 252 vibrate with an amplitude and a wavelength different from those in the other areas.

Figure 8:
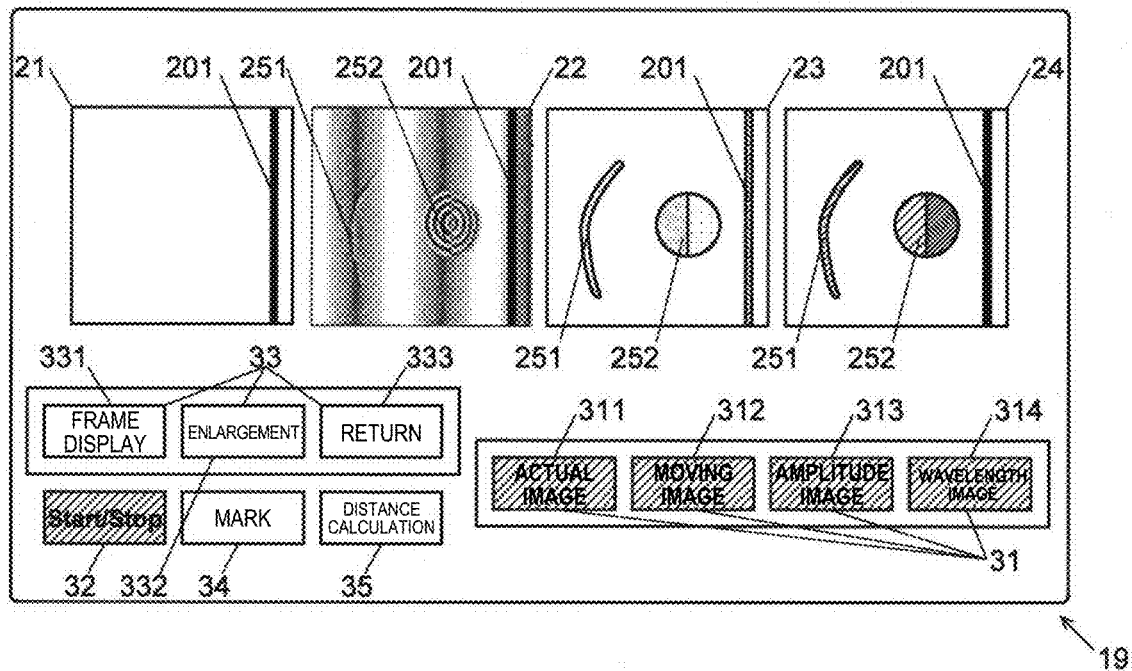
FIG. 8 is a diagram illustrating an example of simultaneously displaying all of an optical image, a moving image, an amplitude distribution image, and a wavelength distribution image.

When the operator performs a predetermined operation using the input unit 18 (for example, clicking a button displayed on the display unit 19 with a mouse), the display control unit 166 performs control to simultaneously display four images of the optical image 21, the moving image 22, the amplitude distribution image 23, and the wavelength distribution image 24 on the display unit 19. FIG. 8 illustrates an example in which the four images are simultaneously displayed on the display unit 19. As described above, since these four images display the same area, the operator can confirm whether some object is displayed at the same position in the optical image 21 corresponding to the area discontinuously appearing in any one of the moving image 22, the amplitude distribution image 23, and the wavelength distribution image 24, by comparing these four images. This makes it possible to determine whether the discontinuous area is caused by a defect or is not a defect, such as a groove, that is originally included in the inspection object S. In the example of FIG. 8, since it is shown that a groove appears in the optical image 21 in the area denoted by reference numeral 201, it can be determined that the area is not a defect. On the other hand, since no groove, hole, or the like appears in the areas 251 and 252 in the optical image 21, it can be determined that the discontinuity appearing in these areas in the moving image 22 or the like is due to a defect.

In addition, comparing the vibration state images, that is, the moving image 22, the amplitude distribution image 23, and the wavelength distribution image 24, with each other may make it possible to find a defect that is not clearly shown in one of these images, based on another image. As a result, the defect can be more reliably detected.

Figure 9:
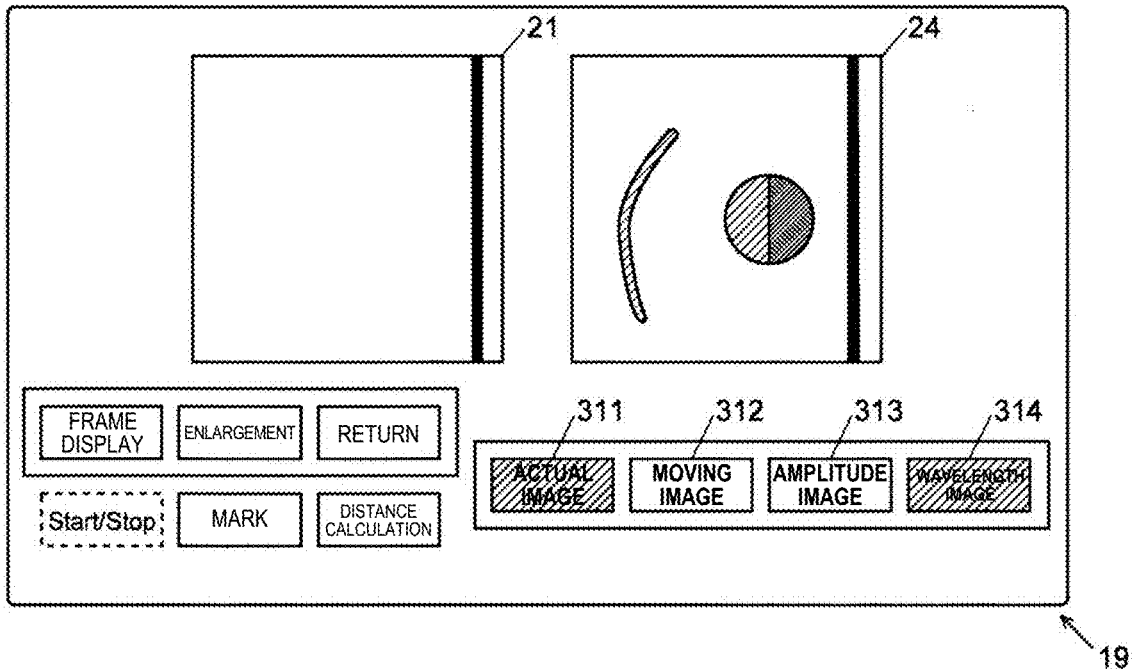
FIG. 9 is a diagram illustrating an example of simultaneously displaying two images among an optical image, a moving image, an amplitude distribution image, and a wavelength distribution image.

In the example illustrated in FIG. 8, in addition to the above-described four images, image display selection buttons 31 (optical image display selection button 311, moving image display selection button 312, amplitude distribution image display selection button 313, and wavelength distribution image display selection button 314) for selecting whether or not to display each image is displayed. The display image selection processing unit 1661 performs processing of displaying these selection buttons, and also performs processing of switching display/non-display of an image corresponding to one of these selection buttons every time the operator clicks one of these selection buttons using the input unit 18 once. FIG. 9 illustrates an example in which "display" is selected with the optical image display selection button 311 and the wavelength distribution image display selection button 314 (the selected buttons are colored) and "non-display" is selected with the moving image display selection button 312 and the amplitude distribution image display selection button 313 (the buttons are not colored). In accordance with this selection, the display image selection processing unit 1661 executes processing so as to display only the optical image 21 and the wavelength distribution image 24 on the display unit 19. Of course, the combination of images to be displayed is not limited to that illustrated in FIG. 9, and any combination is possible.

The example illustrated in FIG. 8 further displays a moving image replay start/stop button 32, a display area designation operation button 33, an interest region setting button 34, and a distance calculation operation button 35, which are buttons for executing a predetermined operation on the displayed image.

When the moving image replay start/stop button 32 is clicked once, the replay of the moving image 22 is started, and when the moving image replay start/stop button is clicked once again, the replay of the moving image 22 is stopped, and an operation is performed to display a still image at the time of stop.

Figure 10:
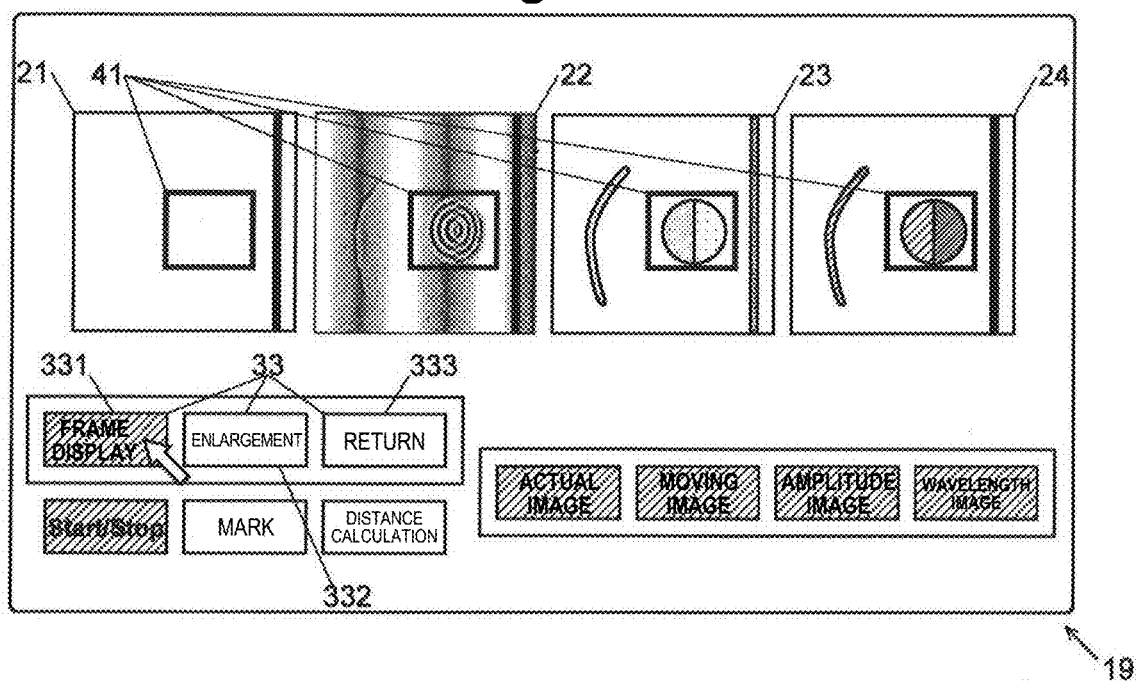
FIG. 10 is a diagram illustrating an example in which a frame for designating a display area is displayed in the vibration state image and the optical image displayed on a display unit.
Figure 11:
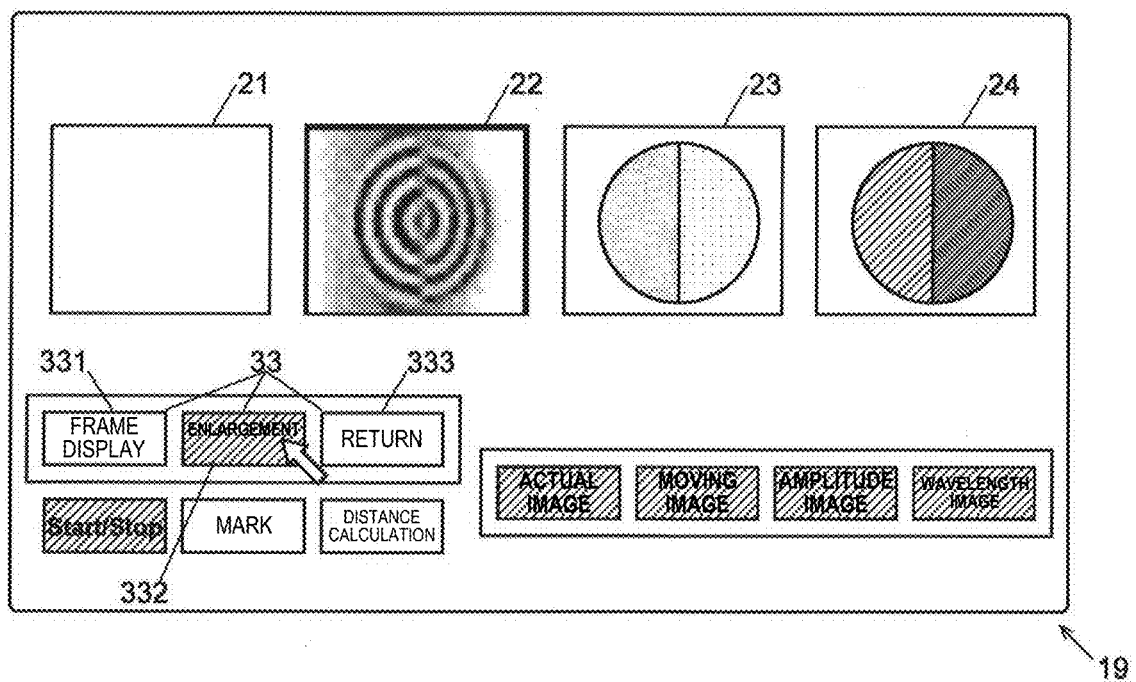
FIG. 11 is a diagram illustrating an example in which a vibration state image and an optical image in a display area enlarged by the frame illustrated in FIG. 10 are displayed.
Figure 12:
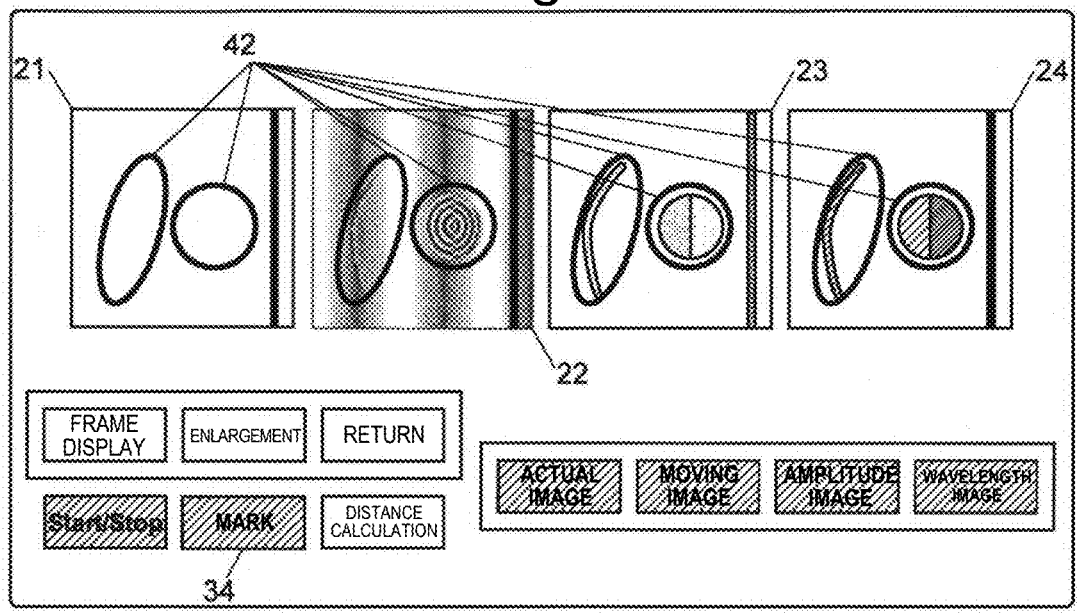
FIG. 12 is a diagram illustrating an example in which a mark indicating an interest region is displayed in the vibration state image and the optical image displayed on the display unit.

The display area designation operation button 33 includes a frame setting button 331, a display area enlargement button 332, and a display area enlargement cancellation button 333. When the operator clicks the frame setting button 331 using the input unit 18, the area designation screen display control unit 1651 performs control to display the rectangular frame 41 at the same position corresponding to each other in all of (a maximum of) four images displayed at that time (FIG. 10). When the operator performs an operation of moving the frame 41 using the input unit 18 or changing the vertical and horizontal lengths in any one of the four images, the display area designation operation control unit 1652 performs control to change the position, shape, and size of the frame 41 in the one image and display the frame 41 at the same position, shape, and size in the other (a maximum of) three images. When the operator clicks the display area enlargement button 332 using the input unit 18 after setting the position, shape, and size of the frame 41 in this manner, the display control unit 166 performs control to enlarge (increase the magnification of) the inside of the frame 41 and display four images (FIG. 11). It is also possible to further enlarge the image by the operator further performing a similar operation in this state. On the other hand, when the operator clicks the display area enlargement cancellation button 333 using the input unit 18, an image previous to the image displayed at that time, that is, an image with a lower magnification is displayed.

The interest region setting button 34 is a button used to perform an operation of displaying a region in which the operator is interested, in (a maximum of) four images. When the operator clicks the interest region setting button 34 using the mouse as the input unit 18 and then performs an operation of drawing a closed curve indicating the interest region while pressing a mouse button in one of the four images, the interest region display control unit 1672 draws a closed curve in the one image and draws the same image at the same corresponding position in the other (a maximum of) three images. When the operator releases the mouse button, the interest region setting control unit 1671 sets the drawn closed curve as the interest region and stores it in the storage unit 17.

For example, when the operator performs an operation of drawing a rectangle while pressing the mouse button as the input unit 18 in one of the four images, a closed curve such as the rectangle or an ellipse inscribed in the rectangle (a perfect circle when a square is drawn) is displayed in all the four images. In addition, the rectangle or ellipse may be inclined by an operation with the mouse. In the example illustrated in FIG. 12, a closed curve in which an ellipse is inclined and a perfect circle are displayed as the interest region 42.

Displaying the interest region set in this manner in the four images makes it possible to recognize a region to be noted when the operator views the images later.

Figure 13:
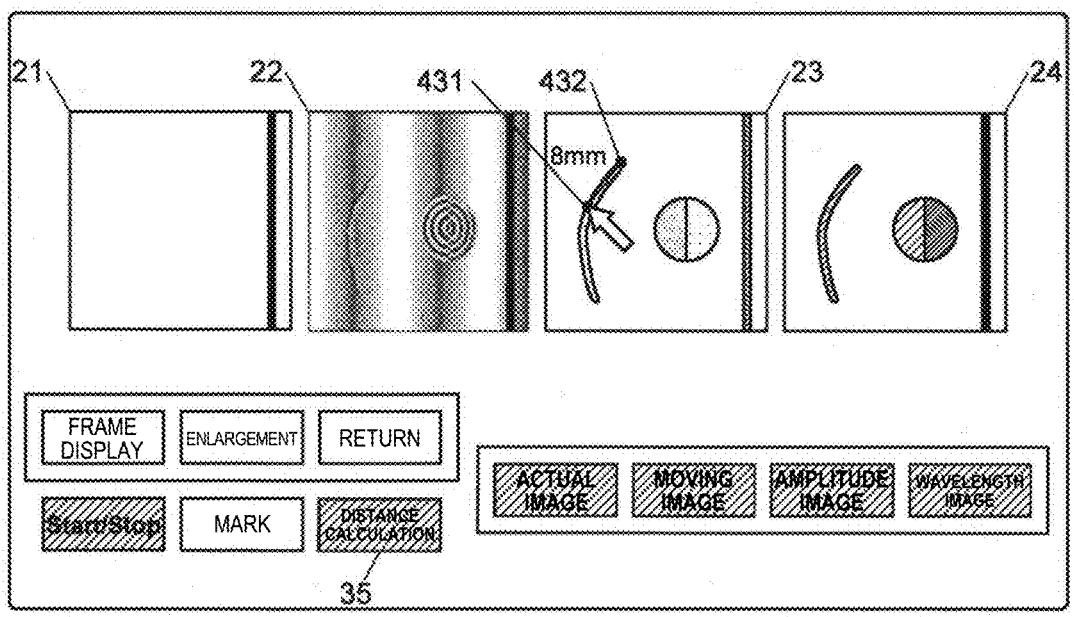
FIG. 13 is a diagram illustrating an example of performing an operation of obtaining a distance between two points in a vibration state image or an optical image displayed on the display unit.

The distance calculation operation button 35 is used to calculate a distance between two points on the surface of the inspection object S. When the operator clicks the distance calculation operation button 35 using the input unit 18 and then clicks two points 431 and 432 as illustrated in FIG. 13 in one of (a maximum of) four images, the distance calculation position setting unit 1681 sets the two points 431 and 432 as distance calculation targets. Then, the distance calculation unit 1682 calculates the distance between the two points on the surface of the inspection object S by calculating the distance on the image between the two points set by the distance calculation position setting unit 1681 and dividing the distance by the display magnification of the image. The distance display control unit 1683 superimposes and displays the value of the distance calculated by the distance calculation unit 1682 on the image in which the points 431 and 432 are set.

Conventionally, when obtaining the distance between two points displayed on the moving image 22 and the amplitude distribution image 23, a graduated scale has been displayed on these images, and an operator has read the scale. On the other hand, in the present embodiment, the distance between the two points on the surface of the inspection object S can be easily obtained simply by setting the two points using the input unit 18.

(3) Modifications

The present invention is not limited to the above embodiment, and can be appropriately modified within the scope of the gist of the present invention.

For example, in the above embodiment, a speckle-sharing interferometer is used to acquire the vibration state image, but a speckle interferometer may be used instead.

In the above embodiment, the three images, that is, the moving image, the amplitude distribution image, and the wavelength distribution image are created and displayed as the vibration state images, but only one or two of them may be created and displayed, or other vibration state images may be displayed.

The method of setting and changing the display area is not limited to the above example. For example, after the center position of the image to be displayed is determined by dragging the image on the display unit 19 using the mouse or the like of the input unit 18, the display area may be set/changed by enlarging or reducing the image at a predetermined magnification by clicking the "enlargement" or "reduction" button or by inputting a numerical value of the magnification.

The interest region setting unit 167 and the distance calculation/display unit 168 are not essential components in the present invention, and may be omitted.

In addition, various configurations described in the above embodiment and modifications may be appropriately combined.

[Modes]

It is obvious for those skilled in the art that the above-described exemplary embodiment is a specific example of the following modes.

(Clause 1) A defect detection device according to clause 1 includes:
an excitation unit configured to apply vibration to an inspection object;
a vibration state image creation unit configured to measure by an optical means a vibration state in a measurement area on a surface of the inspection object to which the vibration is applied, and to create one or more types of vibration state images representing the vibration state in the measurement area according to a result of the measurement; an optical image acquisition unit configured to acquire an optical image in the measurement area;
an image display unit configured to display an image; and
a display control unit configured to perform control to simultaneously display two images among the one or more types of vibration state images and the optical image for a same area in the measurement area on the image display unit.

In the defect detection device according to clause 1, two (or three or more) images among one or more types of vibration state images and the optical image used for detection of a defect for the same display area in the measurement area are simultaneously displayed on the image display unit, so that positions can be easily compared between the images.

The combination of images simultaneously displayed on the image display unit may be a combination of one or more of the vibration state images and the optical image, or a combination of a plurality of the vibration state images without the optical image.

As the vibration state image, for example, a moving image indicating a vibration state or an amplitude image displayed as a still image, in which the amplitude of vibration is color-coded (including color-coding by gray scale brightness) for each position in the display area, can be used. In addition, a wavelength image described next can also be used as the vibration state image.

(Clause 2) A defect detection device according to clause 2 is the defect detection device according to clause 1, wherein the one or more types of vibration state images includes a wavelength image in which a difference in wavelength of vibration is color-coded and displayed as a still image for each position in the display area.

In the defect detection device according to clause 2, the wavelength of vibration is color-coded and displayed for each position in the display area, so that a position vibrated at a wavelength different from those of other positions due to the presence of a defect can be specified, whereby the defect can be detected. In addition, the defect generated in the inspection object includes a plurality of different forms such as a crack and peeling of the coating applied to the surface of the inspection object, but the transmission speed of the vibration is different depending on the difference in the forms, and thus the wavelength is also different. Therefore, it is possible to distinguish the form of the defect based on the difference in the wavelength of the vibration.

(Clause 3) A defect detection device according to clause 3 is the defect detection device according to clause 1 or 2, further including:

an area designation screen display control unit configured to perform control to display one of the one or more types of vibration state images and the optical image on the image display unit, and also superimpose and display a display area designation image which is an image indicating a display area in the image displayed on the image display unit; and a display area designation operation control unit configured to set a size and a position of the display area designation image by an input operation of an operator, wherein the display control unit is configured to perform control to simultaneously display two images among the one or more types of vibration state images and the optical image on the image display unit with the display area set by the control of the display area designation operation control unit as the same display area.

In the defect detection device according to clause 3, the display area desired by the operator can be set by an input operation.

(Clause 4) A defect detection device according to clause 4 is the defect detection device according to any one of clauses 1 to 3, further including:

an interest region setting control unit configured to perform control to display one of the one or more types of vibration state images and the optical image on the image display unit, and to set an interest region in the image displayed on the image display unit by an input operation of an operator; and an interest region display control unit configured to perform control to display a mark indicating a region corresponding to the interest region on one of the two images in the display area displayed by the display control unit.

In the defect detection device according to clause 4, the mark indicating the interest region, which is a region of interest of the operator, is displayed on one (or may be two or more, and may be all images displayed here) of two or three or more images in the display area displayed on the image display unit. As a result, the operator can compare two or three or more images with the interest region focused. As the mark indicating the interest region, a closed curve indicating the outer edge of the interest region, a symbol indicating the interest region such as an arrow or a triangular mark, or the like can be used.

(Clause 5) A defect detection device according to clause 5 is the defect detection device according to any one of clause 1 to 4, further including:

a distance calculation position setting unit configured to set positions of two points by an input operation of an operator in one image of two or three or more images in a display area displayed on the image display unit; and a distance calculation unit configured to calculate a distance between two points corresponding to the positions of the two points on the surface of the inspection object.

In the defect detection device according to clause 5, simply by the operator setting the positions of the two points in one image of the two or three or more images in the display area displayed on the image display unit, the distance between the corresponding two points on the actual surface of the inspection object can be obtained. As a result, the size or the like of the defect appearing in the image in the display area can be easily measured.

REFERENCE SIGNS LIST

10 . . . Defect Detection Device
11 . . . Signal Generator
12 . . . Vibrator
13 . . . Pulse Laser Light Source
14 . . . Illumination Light Lens
15 . . . Speckle-Sharing Interferometer
151 . . . Beam Splitter
1521 . . . First Reflecting Mirror
1522 . . . Second Reflecting Mirror
153 . . . Phase Shifter
154 . . . Condenser Lens
155 . . . Image Sensor
16 . . . Control Unit
160 . . . Measurement Operation Control Unit
161 . . . Input Reception Unit
162 . . . Displacement Calculation Unit
163 . . . Vibration State Image Creation Unit
1631 . . . Moving Image Creation Unit
1632 . . . Amplitude Distribution Image Creation Unit
1633 . . . Wavelength Distribution Image Creation Unit
164 . . . Optical Image Acquisition Unit
165 . . . Display Area Designation Unit
1651 . . . Area Designation Screen Display Control Unit
1652 . . . Display Area Designation Operation Control Unit
166 . . . Display Control Unit
1661 . . . Display Image Selection Processing Unit
167 . . . Interest Region Setting Unit
1671 . . . Interest Region Setting Control Unit
1672 . . . Interest Region Display Control Unit
168 . . . Distance Calculation/Display Unit
1681 . . . Distance Calculation Position Setting Unit
1682 . . . Distance Calculation Unit
1683 . . . Distance Display Control Unit
17 . . . Storage Unit
18 . . . Input Unit
19 . . . Display Unit
201 . . . Groove
21 . . . Optical Image
22 . . . Moving Image
23 . . . Amplitude Distribution Image
24 . . . Wavelength Distribution Image
251 . . . Streak Area 252 . . . Area in which Striped Pattern Is Formed at Interval Different from Periphery
31 . . . Image Display Selection Button
311 . . . Optical Image Display Selection Button
312 . . . Moving Image Display Selection Button
313 . . . Amplitude Distribution Image Display Selection Button
314 . . . Wavelength Distribution Image Display Selection Button
32 . . . Moving Image Replay Start/Stop Button
33 . . . Display Area Designation Operation Button
331 . . . Frame Setting Button
332 . . . Display Area Enlargement Button
333 . . . Display Area Enlargement Cancellation Button
34 . . . Interest Region Setting Button
35 . . . Distance Calculation Operation Button
41 . . . Frame
42 . . . Interest Region
431, 432 . . . Point for Calculating Distance

The invention claimed is:

1. A defect detection device comprising:
    an excitation unit configured to apply vibration to an inspection object;
    a vibration state image creation unit configured to measure by an optical means a vibration state in a measurement area on a surface of the inspection object to which the vibration is applied, and to create at least one type of vibration state image representing a spatial distribution of the vibration state in the measurement area according to a result of the measurement;
    an optical image acquisition unit configured to acquire an optical image in the measurement area;
    an image display unit configured to display images; and
    a display control unit configured to perform control that causes at least two images for corresponding areas of in the measurement area to be simultaneously displayed on the image display unit, the at least two images being selected from the group consisting of the at least one type of vibration state image and the optical image;
    wherein responding areas represent a same location of the inspection object, such that the optical image and the vibration state image depict an equivalent region of the inspection object.

2. The defect detection device according to claim 1, wherein the at least one type of vibration state image includes a wavelength image in which a difference in wavelength of vibration is color-coded and displayed as a still image for each position in the display area.

3. The defect detection device according to claim 1, further comprising:
    an area designation screen display control unit configured to perform control to display one of the at least one type of vibration state image and the optical image on the image display unit, and also superimpose and display a display area designation image which is an image indicating a display area in the image displayed on the image display unit; and
    a display area designation operation control unit configured to set a size and a position of the display area designation image by an input operation of an operator, wherein
    the display control unit is configured to perform control to simultaneously display, on the image display unit, the at least two images with the display area set by the control of the display area designation operation control unit as the same area.

4. The defect detection device according to claim 1, further comprising:
    an interest region setting control unit configured to perform control to display one of the at least one type of vibration state image and the optical image on the image display unit, and to set an interest region in the image displayed on the image display unit by an input operation of an operator; and
    an interest region display control unit configured to perform control to display a mark indicating a region corresponding to the interest region on one of the at least two images in the display area displayed by the display control unit.

5. The defect detection device according to claim 1, further comprising:
    a distance calculation position setting unit configured to set positions of two points by an input operation of an operator in one image of two or three or more images in a display area displayed on the image display unit; and
    a distance calculation unit configured to calculate a distance between two points corresponding to the positions of the two points on the surface of the inspection object.

* * * * *